(12) United States Patent
Oi et al.

(10) Patent No.: US 6,293,307 B1
(45) Date of Patent: Sep. 25, 2001

(54) VALVE ASSEMBLY WITH CHECK VALVE FOR GAS CYLINDER

(75) Inventors: Akira Oi; Mari Shiotsuki; Mitsumasa Kagomoto, all of Amagasaki (JP)

(73) Assignee: Kabushiki Kaisha Neriki, Hyogo (JP)

( * ) Notice: Subject to any disclaimer, the term of this patent is extended or adjusted under 35 U.S.C. 154(b) by 0 days.

(21) Appl. No.: 09/813,785

(22) Filed: Mar. 22, 2001

(30) Foreign Application Priority Data

Mar. 22, 2000 (JP) .................................................. 12-79225

(51) Int. Cl.⁷ .............................. B65B 3/04; F16K 21/00
(52) U.S. Cl. ........................................ 137/614.2; 137/460
(58) Field of Search .................... 137/613, 614.2, 137/460

(56) References Cited

U.S. PATENT DOCUMENTS

| | | |
|---|---|---|
| 4,210,168 | 7/1980 | Yonezawa . |
| 4,341,245 | 7/1982 | Daicho et al. . |
| 5,048,565 | 9/1991 | Oi . |
| 5,063,976 | 11/1991 | Oi et al. . |
| 5,232,019 | * 8/1993 | Wolff et al. ........................ 137/614.2 |
| 5,309,945 | 5/1994 | Sakai et al. . |
| 5,738,145 | 4/1998 | Daicho et al. . |
| 5,983,935 | * 11/1999 | Inayoshi .............................. 137/614.2 |
| 6,047,727 | 4/2000 | Hatori et al. . |

FOREIGN PATENT DOCUMENTS 56-50234    11/1956   (JP) .

* cited by examiner

*Primary Examiner*—Kevin Lee
(74) *Attorney, Agent, or Firm*—Bacon & Thomas, PLLC

(57) ABSTRACT

A cylinder (32) is hermetically attached into an attaching bore (31) formed within a housing (4) and is made to advance and retreat between a take-out position (A) and a charging position (B). A check valve chamber (28) is formed within the cylinder (32). A check spring (43) resiliently pushes a check valve member (29) inserted into the check valve chamber (28) toward a check valve seat (42). The cylinder (32) has an outer surface provided with an actuation portion (50). If the actuation portion (50) is pushed, it retracts the cylinder (32) toward the charging position (B). Provided at a position opposing to the check valve member 29 through a chamber inlet (40) of the check valve chamber (28) is a receiving portion (46), which receives the check valve member (29) on a halfway while the cylinder (32) is retreating.

9 Claims, 6 Drawing Sheets

VALVE ASSEMBLY WITH CHECK VALVE FOR GAS CYLINDER

BACKGROUND OF THE INVENTION

1. Field of the Invention

The present invention relates to a valve assembly which is attached to a gas cylinder for storing compressed gas and liquefied gas.

2. Explanation of Related Art

There is a conventional example of the valve assembly with a check valve of this type, disclosed in Japanese Utility Model Publication No. 56-50234 proposed earlier by an Assignee of the present invention.

The conventional example comprises a housing within which an inlet bore communicates with an outlet bore through a shut off valve chamber, a check valve seat and a check valve chamber in the mentioned order. A check spring resiliently pushes for valve closing, a check valve member inserted into the check valve chamber to the check valve seat. The check valve member is formed with a cavity for valve opening, which is opposed to the outlet bore.

And when charging new gas into a gas cylinder, a valve opening means provided at a leading end of a gas charging mouthpiece is hermetically fitted into the cavity and a pressure of the charging gas separates the check valve member from the check valve seat.

The conventional technique can forcedly open the check valve with the pressure of the charging gas. Further, the check valve member can be opened or cancelled from being opened at the same time as the gas charging mouthpiece is attached to or detached from an outlet nozzle of the valve assembly. Therefore, it is excellent because of easiness in operation during the gas charging. However, the conventional technique has to be still improved on the following points.

(1) It takes lots of time to effect the gas charging.

Since the gas charging mouthpiece is inserted into the outlet bore having a narrow and limited size, a gas charging passage within the leading end portion of the mouthpiece cannot help having a reduced flow passage sectional area. Besides, it is necessary to make a hermetically sealing and sliding portion of the cavity provided in the check valve member larger than a valve face of the check valve member in sectional area. Therefore, the valve opening means cannot help but have an increased outer diameter. In addition, a flow passage sectional area is reduced between an inner peripheral surface of the outlet bore and an outer peripheral surface of the valve opening means. As such, at the time of charging gas, the flow passage sectional area is so small that it takes a long time to charge the gas. In the case where the gas to be charged is liquefied gas, this problem appears as a more remarkable disadvantage because flow resistance becomes larger.

(2) Low workability at the time of effecting the gas charging.

As the check valve becomes smaller, it is harder to hermetically fit into the cavity the valve opening means provided at the leading end of the gas charging mouthpiece. Further, there is a necessity of interposing an O-ring or the like sealing means in a space defined between the hermetically sealing and sliding surface of the cavity and the outer peripheral surface of the valve opening means. However, if this sealing means is damaged because of biting dust and the like foreign matters and so on, it causes an erroneous valve opening with the result of decreasing the working efficiency at the time of charging gas.

(3) It is impossible to reduce a diameter of a connecting threaded portion which is formed in the outlet nozzle.

The valve opening means has to be inserted into the outlet bore. Therefore, the outlet nozzle cannot help but increase its outer diameter. This results in the problem of being able to put into practice only the threaded portion of large diameter for the connecting one which is formed in an outer periphery of the outlet nozzle.

SUMMARY OF THE INVENTION

The present invention has an object to shorten the time taken for charging gas, to improve the working efficiency when effecting the charging work and to reduce the outer diameter of the outlet nozzle.

In order to accomplish the above object, the present invention has constructed a valve assembly with a check valve in the following manner, for example, as shown in FIGS. 1 to 6.

It comprises a housing 4 formed with a bore 31 for attaching an inlet bore 6,7, a shut off valve chamber 10,21, an outlet bore 18 and a check valve 80. A cylinder 32 is hermetically attached into the attaching bore 31 and is made to advance and retreat between a take-out position (A) and a charging position (B). The cylinder 32 has an interior area provided with a check valve chamber 28. The check valve chamber 28 has a chamber inlet 40 which communicates with the inlet bore 6,7 through the shut off valve chamber 10, 21 and has a chamber outlet 41 which communicates with the outlet bore 18. A check valve seat 42 is formed on a periphery of the chamber inlet 40. A check valve member 29 and a check spring 43 are inserted into the check valve chamber 28. The check spring 43 resiliently pushes the check valve member 29 toward the check valve seat 42. The cylinder 32 has an outer surface provided with an actuation portion 50 between the attaching bore 31 and itself. If this actuation portion 50 is pushed, the cylinder 32 retreats from the take-out position (A) to the charging position (B). And a receiving portion 46 receives the check valve member 29 on a halfway while the cylinder 32 is retreating from the take-out position (A) to the charging position (B).

The present invention functions as follows.

As for a gas cylinder which fluid has been taken out of, the cylinder 32 is switched over to the take-out position (A) where it has advanced in a fluid take-out direction (X). When recharging liquefied gas or compressed gas into this evacuated gas cylinder, first a gas charging mouthpiece 58 is connected to an outlet nozzle 34 provided with the outlet bore 18 and the actuation portion 50 of the cylinder 32 is pushed.

By pushing the actuation portion 50, if the cylinder 32 is retreating in a fluid charging direction (Y), it is accompanied by the check valve member 29 resiliently pushed to the check valve seat 42 through the check spring 43. However, the check valve member 29 is received by the receiving portion 46 on the halfway of its movement and is limited from moving further in the fluid charging direction (Y). On the other hand, the cylinder 32 further retreats in the fluid charging direction (Y) and is switched over to the charging position (B). This separates the check valve member 29 from the valve seat 42 and forcedly opens the valve.

Thereafter, when a shut-off valve opening and closing device 13,23 opens a shut off valve member 12,22, thereby allowing charging gas to flow in, the charging gas is charged from the outlet bore 18 into the gas cylinder 1 through the check valve chamber 28, the shut off valve chamber 10,21 and the inlet bore 6,7 in the mentioned order.

After the gas has been charged, the shut off valve member 12,22 is closed and the gas charging mouthpiece 58 is removed from the outlet nozzle 34. Further, the actuation portion 50 is rid of the pushing force added thereto. This advances the cylinder 32 with a resilient pushing force of the check spring 43 in the fluid takeout direction (X). Meanwhile, the resilient pushing force of the check spring 43 pushes the check valve member 29 to the check valve seat 42 to thereby close the valve. The check valve chamber 28 communicates with the atmosphere through the outlet bore 18 owing to the removal of the gas charging mouthpiece. However, the flow passage present on the side of the shut of f valve chamber 10,21 rather than on the side of the cylinder 32 has an interior area having a pressure slightly higher than the atmospheric pressure since the check valve member 29 is closed. The thus resulting pressure difference moves the cylinder 32 together with the check valve member 29 in the fluid take-out direction (X) and switches it over to the take-out position (A).

The present invention is constructed and functions as mentioned above. Therefore, it brings forth the following advantages.

(1) In order to open the check valve member when charging gas, it is sufficient if the actuation portion formed in the cylinder 32 is pushed to retract the cylinder. Accordingly, there is no need of inserting the leading end portion of the gas charging mouthpiece and the valve opening means into the outlet bore. Further, the check valve member need not be provided with the cavity. In consequence, when charging gas, the outlet bore does not decrease its flow passage sectional area and experiences only a small flow resistance, which results in the possibility of shortening the charging time.

(2) During the gas charging work, the check valve member is forcedly opened only by retracting the cylinder. This prevents the erroneous valve opening attributable to the damage of the sealing means, which was likely to occur in the conventional technique, and enhances the working efficiency.

(3) It is sufficient if the actuation portion is formed in the cylinder. Therefore, it can be provided in an outer surface of the cylinder. This gets rid of the necessity to attach the valve opening means and the like employed by the conventional technique to the gas charging passage. As a result, when opening the check valve member, it is possible to inhibit foreign matters outside the valve assembly from riding on the current of the charging gas and flowing into the gas cylinder. This can prevent the interior of the gas cylinder from being polluted during the gas charging.

(4) It is not necessary to insert the leading end portion of the gas charging mouthpiece and the valve opening means into the outlet bore. Thus the outlet nozzle can reduce its outer diameter, which makes it possible to readily put into practice even the threaded portion of small diameter for the connecting one.

The present invention includes the following valve assembly with a check valve.

For example, as shown in FIGS. 2 to 4, a pressure chamber 48 is provided within the attaching bore 31. The cylinder 32 retreats from the take-out position (A) to the charging position (B) by acting fluid pressure within the pressure chamber 48 onto the actuation portion 50. It is possible to employ a portion of the charging gas, branched and guided from the gas charging mouthpiece 58 and the like, for the pressurized fluid.

Further, for instance, as shown in FIG. 5, there is provided an insertion hole 64 which communicates the attaching bore 31 with an exterior of the housing 4. A pushing means 65 is inserted into the insertion hole 64. In this case, the cylinder 32 is retracted and is switched over to the charging position (B) by pushing the actuation portion 50 with the pushing means 65.

There may be arranged within the housing 4, a return spring 37 which resiliently pushes the cylinder 32 in the fluid take-out direction (X). In this case, if the actuation portion 50 is rid of the pushing force applied thereto, the cylinder 32 is resiliently pushed by the return spring 37 to advance in the fluid take-out direction (X) and is smoothly switched over to the takeout position (A).

Preferably, the return spring 37 has a resilient pushing force set to a value larger than that of reversely flowing fluid pressure applied to a sectional area 54 of a hermetically sealing and sliding portion 53 of the cylinder 32. In this case, for example, even if reversely flowing gas enters from the outlet bore 18 when taking out gas, the cylinder 32 is retained at the take-out position (A). And the check valve member 29 is pushed to the check valve seat 42 with the resilient pushing force of the check spring 43 and the reversely flowing gas pressure to close the valve. Accordingly, there is no likelihood that the reversely flowing gas enters into the gas cylinder.

Even when the resilient pushing force of the return spring 37 is set more weakly than in the above case, it is sufficient if it is set to a value larger than a pressure of the reversely flowing fluid applied to a differential area obtained by deducting a sectional area 55 of a valve face of the check valve member 29 from the sectional area 54 of the hermetically sealing and sliding portion 53. In this case, if a fluid pressure applied to the sectional area 54 of the hermetically sealing and sliding portion 53 is larger than the resilient pushing force of the return spring 37, the cylinder 32 retreats together with the check valve member 29 in the fluid charging direction (Y). However, when the check valve member 29 reaches a limiting position (C) where it is received by the receiving portion 46, the fluid pressure which retracts the cylinder 32 in the fluid charging direction (Y) comes to a fluid pressure that is applied to a differential area obtained by deducting the sectional area 55 of the valve face of the check valve member 29 from the sectional area 54 of the hermetically sealing and sliding portion 53. As a result, the resilient pushing force of the return spring 37 becomes larger than the fluid pressure which retracts the cylinder 32 and therefore the cylinder 32 does not retreat any more. And the check spring 43 and the reversely flowing fluid pressure closes the check valve member 29, so that the reversely flowing fluid is unlikely to enter into the gas cylinder.

Preferably, the valve face of the check valve member 29 has the sectional area 55 set to a value larger than that of the sectional area 54 of the hermetically sealing and sliding portion 53 of the cylinder 32. In this case, when the cylinder 32 retreats together with the check valve member 29 in the fluid charging direction (Y) and arrives at the limiting position (C) with the flow-in pressure of the reversely flowing fluid, a force is applied to the cylinder 32 in the fluid take-out direction (X). As a result, the cylinder 32 does not retreat over the limiting position (C) and the check valve member 29 is closed by the check spring 43 and the reversely flowing fluid pressure to result in removing the likelihood that the reversely flowing fluid enters into the gas cylinder.

If the cylinder 32 further moves over the limiting position (C) in the fluid charging direction (Y), the check valve member 29 opens. Accordingly, there is a fear of experiencing an incorrect operation such as pushing in the cylinder 32 by inserting an operation rod and the like from the outlet bore 18 for the purpose of charging, e.g., defective gas of inferior quality and the like. Then in order to prevent such an incorrect operation, preferably, the chamber outlet 41 is formed to have an inner diameter not less than that of the outlet bore 18. In this case, even if the operation rod or the like is inserted from the outlet bore 18, its leading end merely pushes in the check valve member 29 but cannot push in the cylinder 32 directly. As a result, when the check valve member 29 is received by the receiving portion 46, the cylinder 32 is not pushed in further. The check valve member 29 is closed by the check spring 43 and the push-in force to result in preventing defective gas from being charged and the like.

For example, as shown in FIG. 6, the cylinder 32 is provided with an engaging portion 68 and the attaching bore 31 is provided with a limiting means 69. When the cylinder 32 is switched over to the take-out position (A), the limiting means 69 engages with the engaging portion 68 to limit the cylinder 32 from moving toward the charging position (B). And cancellation of this engagement allows the cylinder 32 to retreat toward the charging position (B).

In this case, as far as the engagement of the engaging portion 68 with the limiting means 69 is not cancelled, the cylinder 32 is retained at the take-out position (A) to result in preventing the entrance of the reversely flowing fluid and the defective gas assuredly. When recharging gas, the gas charging mouthpiece 58 is connected to the outlet nozzle 34 and the engaged portion 68 is cancelled from engaging with the limiting means 69. Subsequently, the shut off valve member 11,22 is opened and the charging gas is flowed from the outlet bore 18 into the check valve chamber 28. Then the cylinder 32 retreats together with the check valve member 29. And, for example, if the hermetically sealing and sliding portion 53 of the cylinder 32 has its sectional area 54 increased more than the sectional area 55 of the valve face of the check valve member 29 and is made to form the actuation portion 50, the cylinder 32 is pushed with the pressure of the charging gas and further retreats over the limiting position (C) to be switched over to the charging position (B). The check valve member 29 separates from the check valve seat 42 to open the valve. In the case where the valve face of the check valve member 29 has a larger sectional area, the actuation portion may be provided at the other portion of the cylinder 32 as mentioned above.

After the gas has been charged, the shut off valve member 12,22 is closed and the gas charging mouthpiece 58 is removed from the outlet nozzle 34. Then the resilient pushing force of the check spring 43 advances the cylinder 32 to close the check valve member 29. A pressure remaining on the side of the shut off valve chamber 10,21 advances the cylinder 32 in the fluid take-out direction (X) to switch it over to the take-out position (A). With the cylinder 32 retained at the take-out position (A), the engaging portion 68 engages with the limiting means 69.

DESCRIPTION OF THE PREFERRED EMBODIMENTS

Hereafter, explanation is given for embodiments of the present invention based on the drawings.

Figure 1:
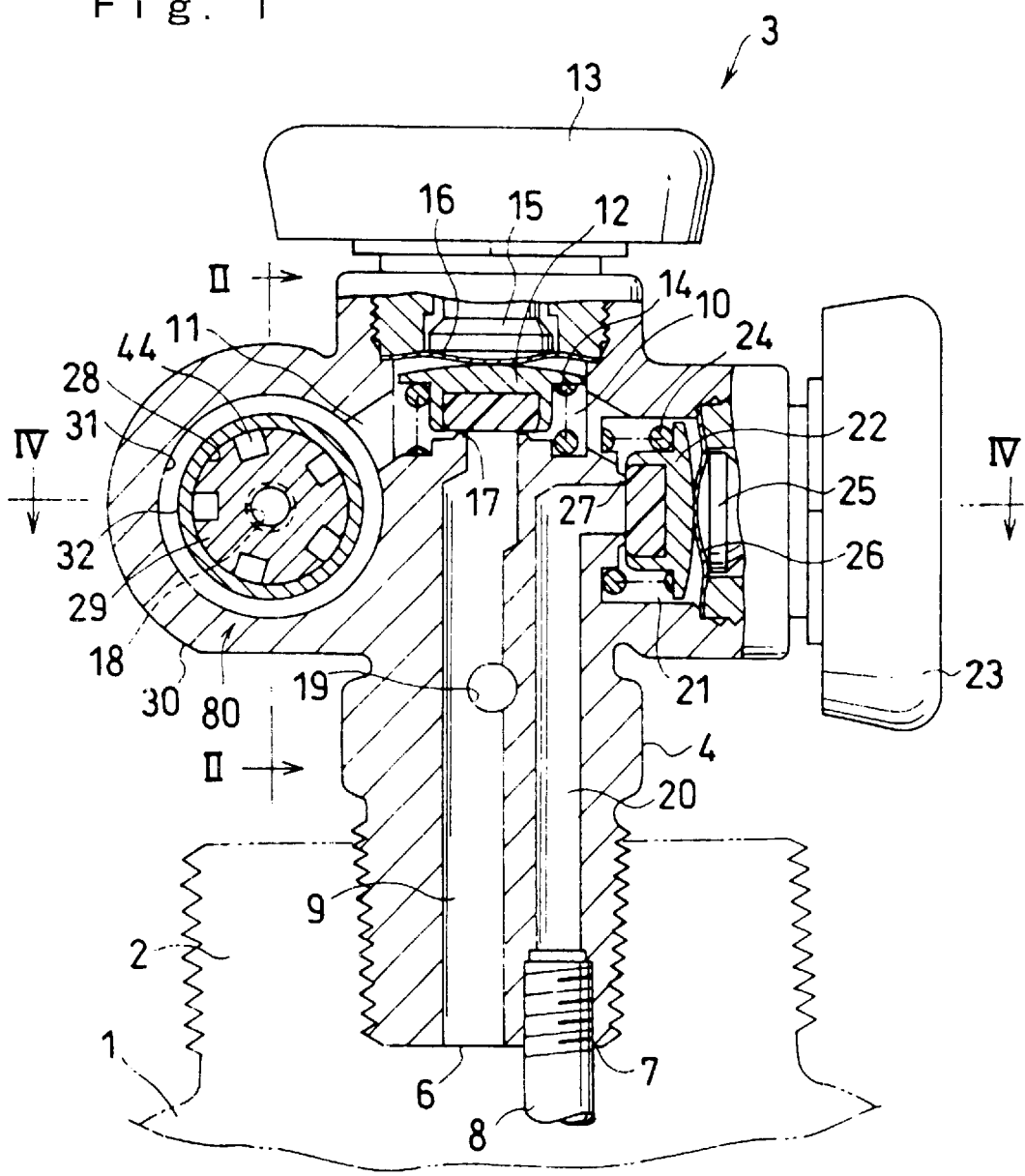
FIG. 1 shows a first embodiment of the present invention and is a vertical sectional view of a valve assembly with a check valve.

As shown in FIG. 1, a gas cylinder 1 has a neck portion 2 to which a housing 4 of a valve assembly 3 is fixed in screw-thread fitting relationship. The housing 4 is made vertically long and its threaded leg 5 has an under surface provided with a gas inlet bore 6 and a liquid inlet bore 7.

The gas inlet bore 6 is used for taking out gaseous phase gas within the gas cylinder 1. The liquid inlet bore 7 is employed for taking out liquid phase gas within the gas cylinder 1 as it remains liquid. The liquid inlet bore 7 has a liquid take-out pipe 8 projecting into a lower space of the gas cylinder 1.

In this embodiment, explanation is given for a gas cylinder which can be used for the case of taking out liquefied gas charged into the gas cylinder, from gaseous phase portion as it remains gaseous as well as for the case of taking it out from liquid phase portion as it remains liquid. However, needless to say, the valve assembly with a check valve according to the present invention is applicable to either of the above both cases. In this case, it suffices if the housing is provided with only one inlet bore.

The gas inlet bore 6 communicates with an intermediate communication passage 11 through a gas inlet vertical passage 9 and a gas shut off valve chamber 10 provided at an upper portion of the housing 4 in the mentioned order. A shut off valve member 12 is vertically inserted into the gas shut off valve chamber 10 so as to be able to open and close. When closing the shut off valve member 12, a handle 13 of an opening and closing device is rotated for fastening to bring the shut off valve member 12 into closing contact with a shut off valve seat 17 against a resilient pushing force of a vale opening spring 14 through a valve rod 15 and a metal diaphragm 16 in the mentioned order. On the other hand, when opening the shut off valve member 12, the handle 13 is rotated for loosening to separate the shut off valve member 12 from the shut off valve seat 17 with the valve opening spring 14, thereby taking the gaseous phase gas within the gas cylinder 1 out of the outlet bore 18 through the gas inlet bore 6, the gas inlet passage 9, the gas shut off valve chamber 10 and the intermediate communication passage 11 in the mentioned order.

The gas inlet passage 9 communicates with a gas blow-out hole of a safety valve (not shown) through a communication passage 19.

The liquid inlet bore 7 communicates with the intermediate communication passage 11 through a vertical liquid inlet passage 20 provided in parallel with the gas inlet passage 9 and a liquid shut off valve chamber 21 provided laterally of the housing 4 in the mentioned order. The liquid shut off valve chamber 21 has a shut off valve member 22 inserted thereinto in a left and right direction in FIG. 1 so as to be able to open and close and is constructed in the same manner as the gas shut off valve chamber 10. More specifically, when closing the shut off valve member 22, a handle 23 of an opening and closing device is rotated for fastening to bring the shut off valve member 22 into closing contact with a shut off valve seat 27 against a resilient pushing force of a valve opening spring 24 through a valve rod 25 and a metal diaphragm 26 in the mentioned order. On the other hand, when opening the shut off valve member 22, the handle 23 is rotated for loosening to separate the shut off valve member 22 from the shut off valve seat 27 with the valve opening spring 24, thereby taking liquid phase gas within the gas cylinder 1 out of the outlet bore 18 through the liquid take-out pipe 8, the liquid inlet bore 7, the liquid inlet passage 20, the liquid shut off valve chamber 21 and the intermediate communication passage 11 in the mentioned order.

There is provided a check valve 80 in a route extending from the both shut off valve chambers 10,21 to the outlet bore 18 via the intermediate communication passage 11.

Figure 2:
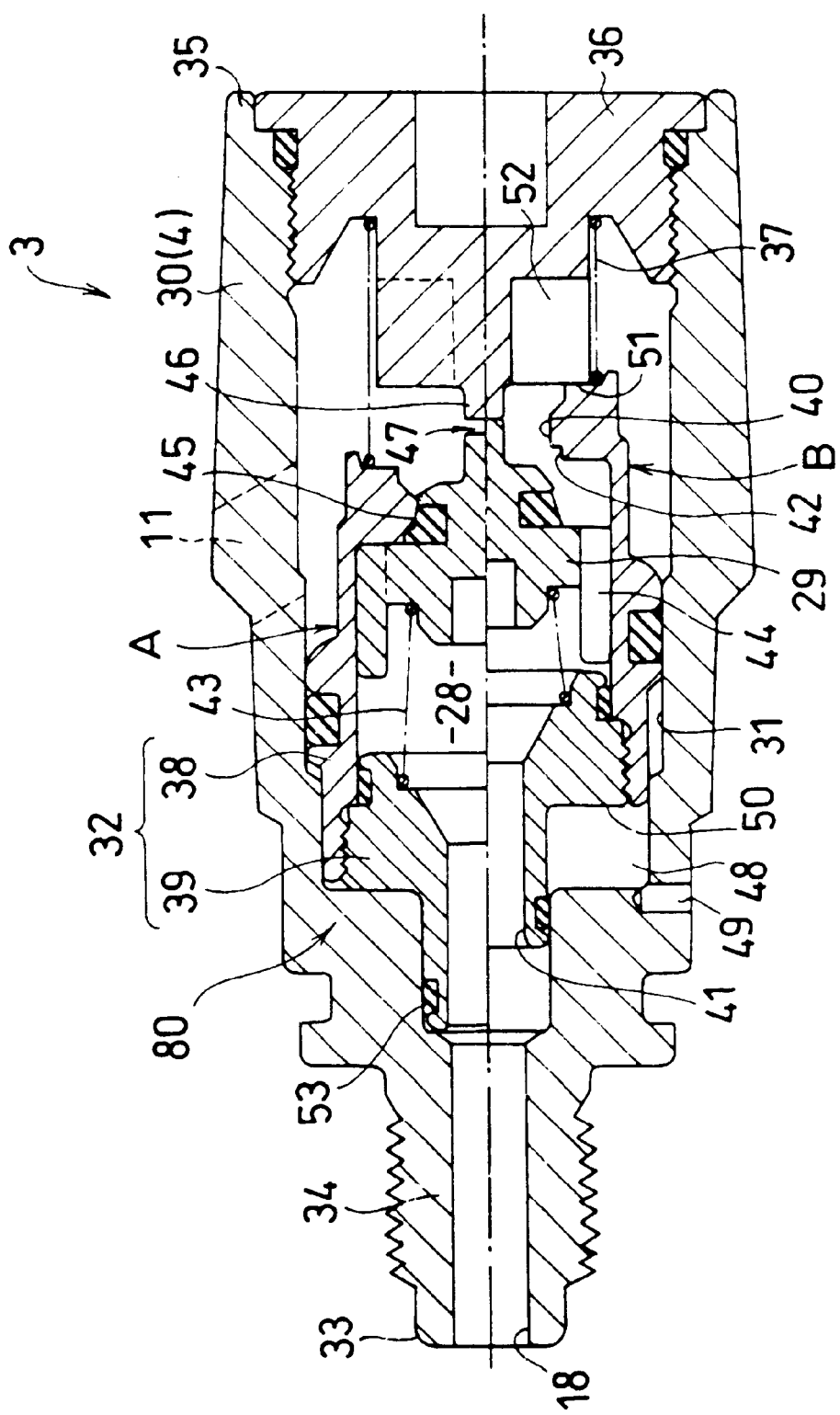
FIG. 2 is a view when seen along a line II—II in FIG. 1 in a direction indicated by arrows.

As shown in FIG. 2, the housing 4 has a horizontally projected portion 30 opposite to a side where the liquid shut off valve chamber 21 is provided. The projected portion 30 has a front end 33 (a left end in FIG. 2) formed with an outlet nozzle 34. The outlet nozzle 34 has an end surface opened to provide the outlet bore 18.

The projected portion 30 has an interior area formed with an attaching bore 31 which extends in a front and rear direction (in a left and right direction in FIG. 2) so that it is opened rearwards (rightwards in the same Figure). The check valve 80 is provided in the attaching bore 31.

A cylinder 32 is attached into the attaching bore 31 hermetically so as to be able to advance and retreat toward the outlet bore 18. The cylinder 32 has an interior area provided with a check valve chamber 28, into which a check valve member 29 is inserted.

The horizontally projected portion 30 has a rear end 35 into which a cylinder presser 36 is hermetically attached in screw-thread fitting relationship. A return spring 37 is arranged between the cylinder presser 36 and the cylinder 32. The cylinder 32 advances toward the outlet bore 18 with a resilient pushing force of the return spring 37 and comes to a take-out position (A) as shown in an upper half portion of FIG. 2.

The cylinder 32 comprises a main body portion 38 and a leading end portion 39 hermetically fixed to a leading end side of the main body portion 38. The main body portion 38 has an interior area formed with the check valve chamber 28 and has a rear end formed with a chamber inlet 40. The leading end portion 39 has a mid portion formed with a chamber outlet 41. The chamber outlet 41 has an inner diameter equal to or more than that of the outlet bore 18 in dimension.

A check valve seat 42 is formed on a periphery of the chamber inlet 40. The check valve member 29 inserted into the check valve chamber 28 is resiliently pushed toward the check valve seat 42 by the check spring 43 within the check valve chamber 28. The check valve member 29 has a peripheral wall formed with at least one flow passage groove 44 in the front and rear direction and has a rear portion to which a packing for its valve face is attached in fitting relationship.

The cylinder 32 accommodating the check valve member 29 is formed into a cassette structure. It can be attached to and detached from the horizontally projected portion 30 only through taking out the cylinder presser 36. This facilitates the maintenance of the check valve.

The cylinder presser 36 has an inner leading end provided with a receiving portion 46 which projects from a position opposing to the check valve member 29 through the chamber inlet 40. As shown in a lower half portion of FIG. 2, the receiving portion 46 can receive merely the check valve member 29 when the cylinder 32 and the check valve member 29 have retreated toward the cylinder presser 36 against the resilient pushing force of the return spring 37.

The check valve member 29 and the receiving portion 46 may be assembled so that with the cylinder 32 at the take-out position (A), the then closed check valve member 29 is brought into direct contact with the receiving portion 46. However, should the receiving portion 46 advance due to an assembling error and the like and push the check valve member 29, the check valve member 29 cannot close. Therefore, it is preferable to provide a clearance 47 between them.

The cylinder 32 has an outer surface provided with a front end surface. A pressure chamber 48 is formed between the front end surface and the attaching bore 31. The pressure chamber 48 is opened to provide an inner end of a pouring passage 49 which communicates with an outer surface of the horizontally projected portion 30.

The front end surface of the cylinder 32 has a portion opposite to the pressure chamber 48, where an actuation portion 50 is formed. When pressurized fluid is flowed into the pressure chamber 48 through the pouring passage 49, the actuation portion 50 is pushed to move the cylinder 32 rearwards (rightwards in FIG. 2) against the resilient pushing force of the return spring 37.

While the cylinder 32 is retreating, the check valve member 29 is received by the receiving portion 46. On the other hand, the cylinder 32 further retreats over this limiting position and is switched over to a charging position (B) shown in the lower half portion of FIG. 2. This separates the check valve member 29 from the check valve seat 42. At the charging position (B), the cylinder 32 is received by an inner end peripheral portion 51 of the cylinder presser 36.

The inner end peripheral portion 51 of the cylinder presser 36 is formed with at least one flow passage recess 52, through which the interior area of the cylinder 32 at the charging position (B) communicates with the intermediate communication passage 11 provided by opening the attaching bore 31.

The valve assembly 3 with the check valve operates as follows.

When taking out gas, the shut off valve member 12,22 for taking out gaseous phase or liquid phase is opened by the handle 13,23. In this valve-opening state, when the gas cylinder 1 has a residual pressure exceeding a set one, a pressure of gas which has flowed into the attaching bore 31 from the intermediate communication passage 11 separates the check valve member 29 from the check valve set 42 against a valve closing force of the check spring 43. This allows the gas within the gas cylinder 1 to flow from the chamber inlet 40 out to the outlet bore 18 through the flow passage groove 44 of the check valve member 29.

On the other hand, if the gas is continuously taken out and the gas cylinder 1 has the residual pressure lowered to the set one, the check valve member 29 is brought into sealing contact with the check valve seat 42 with the valve closing force of the check spring 43. This retains the residual pressure of the gas cylinder 1 at the set one. Even with the shut off valve member 12,22 kept open by mistake, the atmosphere can be prevented from invading the evacuated gas cylinder 1.

Further, when reversely flowing gas has entered from the outlet bore 18 into the check valve chamber 28 for any reason during the gas take-out, a pressure of the reversely flowing gas acts on the check valve member 29 as a valve closing force in addition to that of the check spring 43 to bring the check valve member 29 into sealing contact with the check valve seat 42.

On the other hand, the return spring 37 has so strong a resilient pushing force that it can retain the cylinder 32 at the take-out position (A) against the pressure of the reversely flowing fluid applied to a sectional area of a hermetically sealing and sliding portion 53 on a leading end side of the cylinder 32. The return spring 37 resiliently pushes the cylinder 32 to retain it at the take-out position (A). Thus the reversely flowing gas can be firmly shut off by the check valve member 29 to result in preventing the interior area of the gas cylinder 1 from being polluted by the reversely flowing gas.

Here, in the event that the reversely flowing gas has a pressure higher than an expected one or the return spring 37 has its resilient pushing force set lower, the cylinder 32 retreats together with the check valve member 29 against the resilient pushing force of the return spring 37 with the pressure of the reversely flowing gas.

Figure 3:
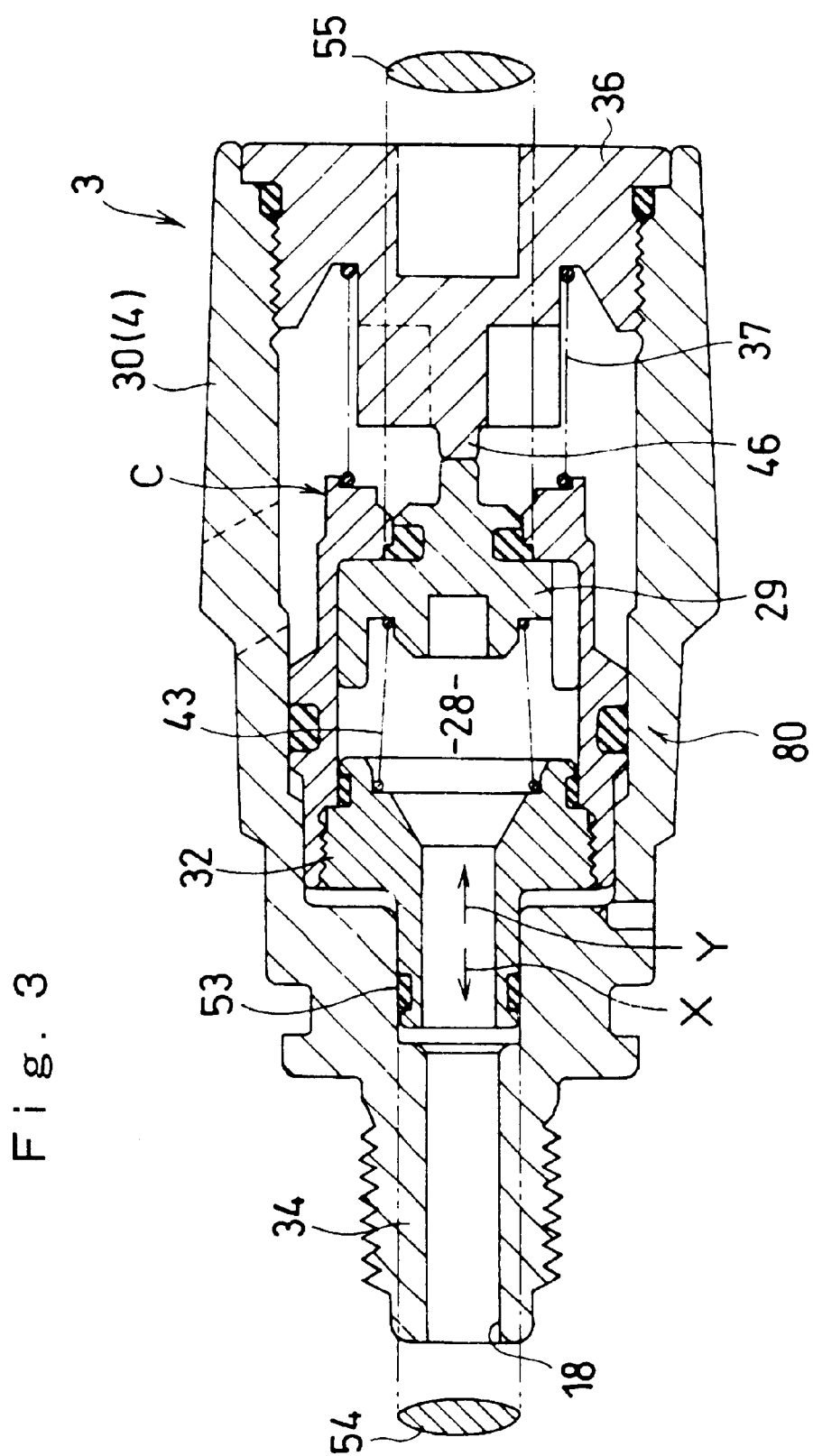
FIG. 3 shows the first embodiment of the present invention and is a view similar to FIG. 2 and illustrating a cylinder and a check valve member when they have retreated to a limiting position.

However, as shown in FIG. 3, the valve face of the check valve member 29 has a sectional area 55 larger than the sectional area 54 of the hermetically sealing and sliding portion 53 on the leading end side of the cylinder 32. Therefore, if the cylinder 32 retreats and reaches the limiting position (C) where the check valve member 29 is received by the receiving portion 46, there is added to the cylinder 32 a pressure corresponding to a differential area between both of the sectional areas 54,55 in a fluid take-out direction (X) (leftward direction in FIG. 3). This results in preventing the cylinder 32 from retreating over the limiting position (C) further rearwardly and enables the check valve member 29 to reliably shut off the reversely flowing gas.

Also in the case where in order to charge defective gas of inferior quality, a charging mouthpiece is attached to the outlet nozzle 34 and the defective gas is flowed from the outlet bore 18 with a pressure, the defective gas is shut off by the check valve member 29 to result in preventing the interior area of the gas cylinder 1 from being polluted, in the same manner as in the case where the reversely flowing gas occurs.

Differently from this embodiment, in the event that the valve face of the check valve member 29 has the sectional area 55 smaller than the sectional area 54 of the hermetically sealing and sliding portion 53, a pressure corresponding to a differential area between both of the sectional areas 54,55 is applied to the cylinder 32 which has reached the limiting position (C), in a fluid charging direction (Y) (rightwards in FIG. 3). In consequence, it is sufficient if the return spring 37 has a resilient pushing force at least strong enough to resiliently push the cylinder 32 toward the take-out position (A) against the pressure of the reversely flowing gas applied to the differential area between both of the sectional areas 54,55. This can allow the check valve member 29 to shut off the reversely flowing gas and to prevent it from flowing into the gas cylinder 1.

Figure 4:
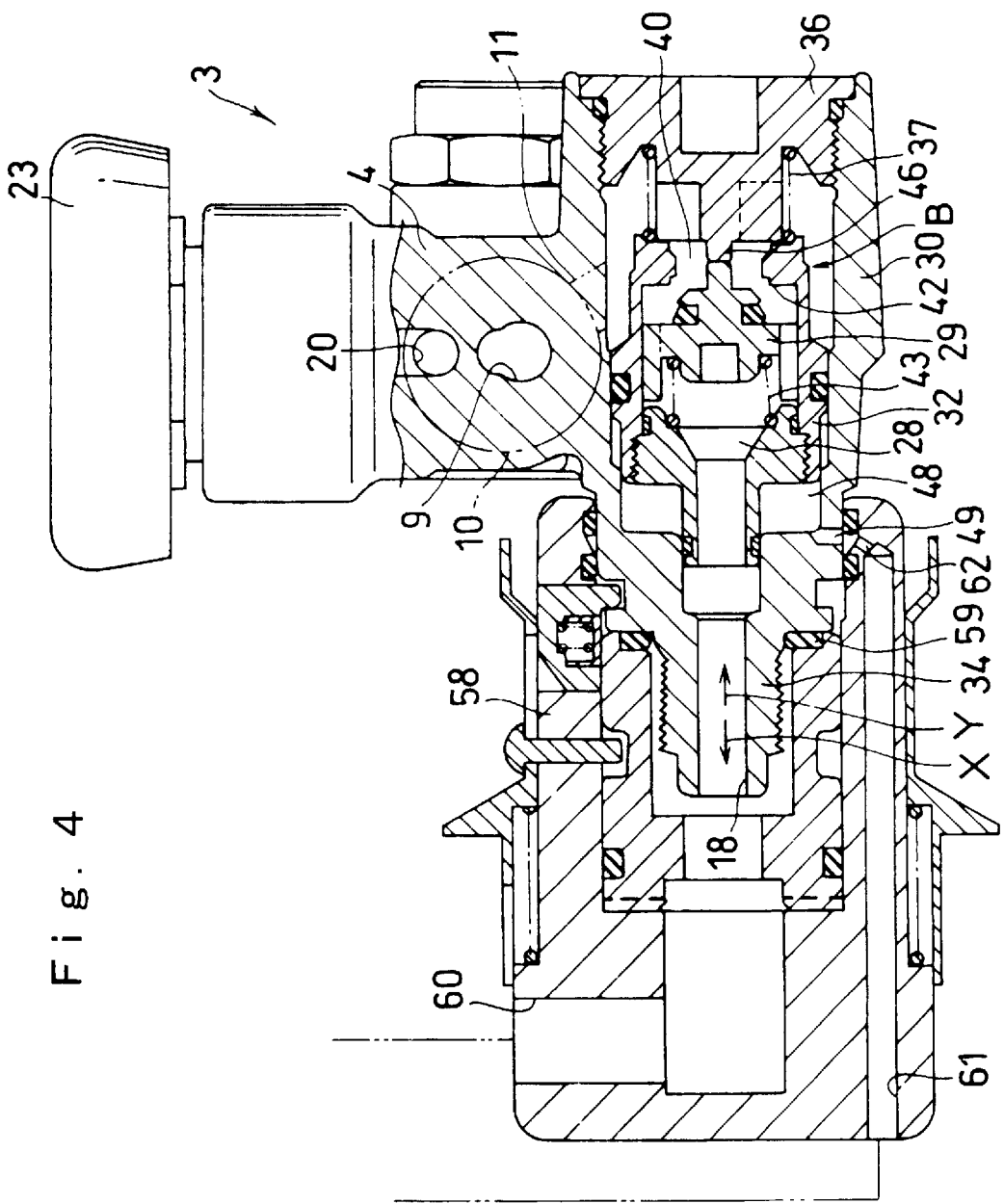
FIG. 4 is a sectional view when seen along a line IV—IV in a direction indicated by arrows in FIG. 1, which shows a valve assembly with a gas charging mouthpiece attached thereto.

When charging gas into the evacuated gas cylinder 1, as shown in FIG. 4, the gas charging mouthpiece 58 is externally fitted onto the outlet nozzle 34 of the valve assembly 3 and is brought into hermetical contact therewith through a gasket 59.

The gas charging mouthpiece 58 has a pressurized fluid supply passage 61 separate from the gas charging passage 60. The supply passage 61 has an outlet 62 which communicates with the pouring passage 49 when the gas charging mouthpiece 58 is attached to the outlet nozzle 34.

And when charging gas, compressed air of the pressurized fluid is supplied from the pressurized fluid supply passage 61 to the pressure chamber 48 through the pouring passage 49. Then a pressure of the compressed air retracts the cylinder 32 in the fluid charging direction (Y) and switch it over to the charging position (B). The check valve chamber 29 is received by the receiving portion 46 on a halfway. Therefore, the check valve member 29 separates from the check valve seat 42 to forcedly open the valve. Subsequently, when either of the shut off valve members 12,22 is opened by the handle 13,23, the charging gas is charged from the gas charging passage 60 of the gas charging mouthpiece 58 into the gas cylinder 1 via the outlet bore 18, the check valve chamber 28, the chamber inlet 40, the intermediate communication passage 11, the shut off valve chamber 10,21, the inlet passage 9,20 and the inlet bore 6,7 in the mentioned order.

After the gas has been charged, the shut off valve member 12,22 is closed and the gas charging mouthpiece 58 is removed from the outlet nozzle 34. This exhausts the compressed air from the pressure chamber 48 and advances the cylinder 32 in the fluid take-out direction (X) (leftwards in FIG. 4) through being resiliently pushed by the return spring 37 to switch it over to the take-out position (A). The check spring 43 resiliently pushes the check valve member 29 to bring it into sealing contact with the check valve seat 42, thereby allowing the check valve member 29 to perform a check action.

In the above, explanation was made for charging gas. But also in the case of vacuuming the evacuated gas cylinder, the check valve is forcedly opened in the same manner.

Nitrogen gas or the like inert gas and liquid pressure may be employed for the pressurized fluid which is supplied to the pressure chamber 48 instead of the compressed air. If charging gas which is intended for charging is branched and supplied, the pressure of the charging gas itself may be also employed.

The pressurized fluid supply passage 61 may be provided separately from the gas charging mouthpiece 58. However, in the event that the pressurized fluid supply passage is provided in the gas charging mouthpiece 58 as in the first embodiment, it can communicate with the pouring passage only by attaching the gas charging mouthpiece to the outlet nozzle. This facilitates the attaching operation and the valve opening operation and therefore is more preferable.

Figure 5:
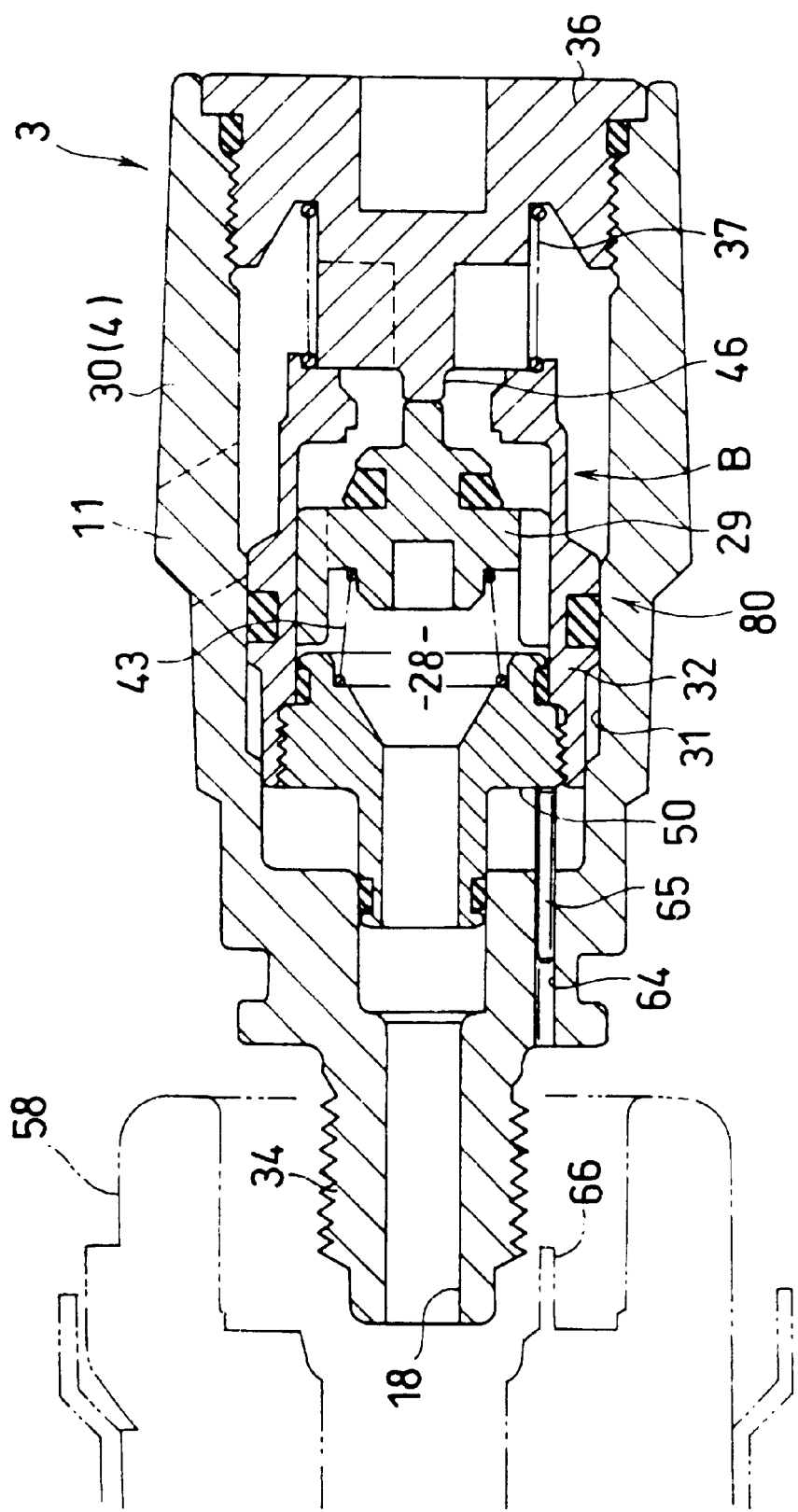
FIG. 5 shows a second embodiment of the present invention and is a sectional view of a horizontally projected portion.
Figure 6:
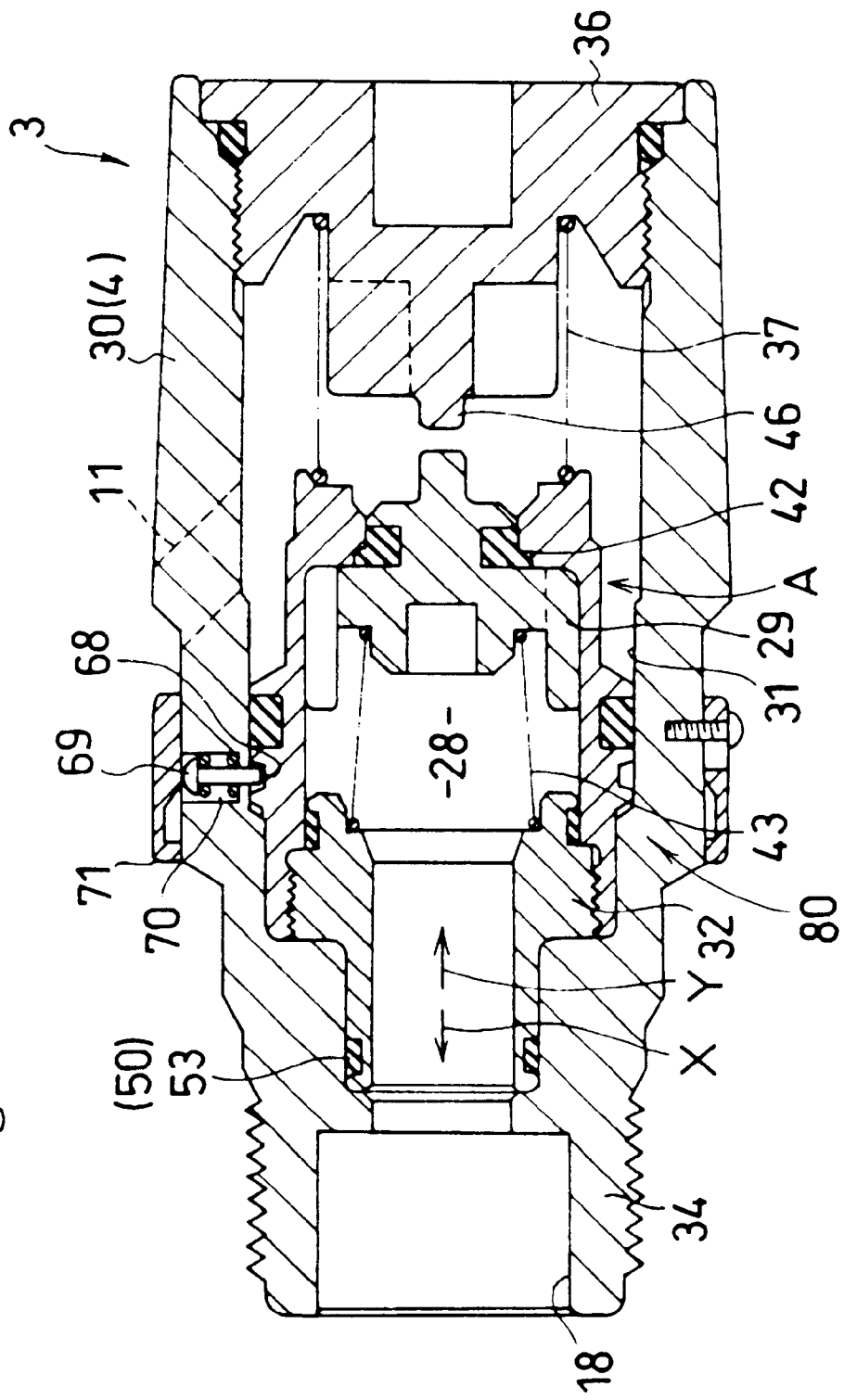
FIG. 6 shows a third embodiment of the present invention and is a sectional view of a horizontally projected portion.

FIGS. 5 and 6 show a second and a third embodiments of the present invention, respectively. In these embodiment, the same constituent members as in the first embodiment are, in principle, explained by putting the same characters.

As shown in FIG. 5, in the second embodiment, the housing 4 has the horizontally projected portion 30 provided with an insertion hole 64 which extends from an outer surface of the housing 4 and reaches the attaching bore 31. A valve opening rod 65 is inserted into the insertion hole 64 so as to be able to advance and retreat, for a pushing means. The actuation portion 50 is formed in the outer surface of the cylinder 32 opposite to an inner end of the insertion hole 64.

When charging gas into the evacuated gas cylinder, the gas charging mouthpiece is attached to the outlet nozzle 34 like in the first embodiment. The gas charging mouthpiece 58 is formed with a pushing projection 66 at a position opposite to the insertion hole 64. And at the time of attaching this gas charging mouthpiece 58, the pushing projection 66 is inserted into the valve rod insertion hole 64 to push the valve opening rod 65. Then a leading end of the valve opening rod 65 pushes the actuation portion 50 of the cylinder 32. This retracts the cylinder 32 to switch it over to the charging position (B). The charging gas is charged into the gas cylinder in the same manner as in the first embodiment.

As shown in FIG. 6, in the third embodiment, the cylinder 32 has the outer surface concaved to provide an annular engaging portion 68 and the attaching bore 31 has a peripheral wall provided with a limiting means 69.

A cancelling spring 70 pushes the limiting means 69 outwardly and resiliently. A sliding member 71 is fitted onto the horizontally projected portion 30 outside the limiting means 69.

When the sliding member 71 pushes an outer end of the limiting means 69, the limiting means 69 has its inner end projected into the attaching bore 31. On the other hand, when the sliding member 71 moves, the cancelling spring 70 moves the limiting means 69 outwards and the limiting means 69 has its inner end accommodated within a peripheral wall of the attaching bore 31.

At the take-out position (A) where the cylinder 32 has advanced in the fluid take-out direction (X), the engaging portion 68 and the limiting means 69 oppose to each other. The limiting means 69 has its inner end engaged with the engaging portion 68 when the sliding member 71 pushes an outer end of the limiting means 69.

In consequence, at the take-out position (A), even if the reversely flowing gas or the like enters, the cylinder 32 does not retreat to result in firmly closing the check valve member 29 and preventing the reversely flowing gas from entering into the gas cylinder.

When charging gas into the evacuated gas cylinder, the gas charging mouthpiece is attached to the outlet nozzle 34 and the sliding member 71 moves to cancel the engagement of the limiting means 69 with the engaging portion 68.

When the shut off valve member opens, thereby allowing the charging gas to flow in, the flow-in pressure retracts the cylinder 32 against the resilient pushing force of the return spring 37. The hermetically sealing and sliding portion 53 of the cylinder 32 constitutes the actuation portion 50. Its sectional area is set larger than the sectional area of the valve face of the check valve member 29. This further retracts the cylinder 32 even after the check valve member 29 has been received by the receiving portion 46 and switches it over to the charging position (B). Thus the check valve member 29 separates from the check valve seat 42 to open the valve, thereby enabling the charging gas to be charged into the gas cylinder.

After the gas has been charged, the shut off valve member is closed and the gas charging mouthpiece is removed from the outlet nozzle 34. This advances the cylinder 32 in the gas take-out direction with the resilient pushing forces of the return spring 37 and the check spring 43 and switch it over to the take-out position (A). Thereafter, when the sliding member 71 moves to push the outer end of the limiting means 69, the limiting means 69 has its inner end engaged with the engaging portion 68.

What is claimed is:

1. A valve assembly with a check valve comprising:
   a housing (4) having a bore (31) for attaching an inlet bore (6,7), a shut off valve chamber (10,21), an outlet bore (18) and a check valve (80);
   a cylinder (32) having an outer surface, which is hermetically attached into the attaching bore (31) and is made to advance and retreat between a take-out position (A) and a charging position (B);
   a check valve chamber (28) formed within the cylinder (32), the check valve chamber (28) having a chamber inlet (40) which communicates with the inlet bore (6,7) through the shut off valve chamber (10,21) and a chamber outlet (41) which communicates with the outlet bore (18);
   a check valve seat (42) formed on a periphery of the chamber inlet (40);
   a check valve member (29) inserted into the check valve chamber (28);
   a check spring (43) inserted into the check valve chamber (28) and resiliently pushing the check valve member (29) toward the check valve seat (42);
   an actuation portion (50) provided in an outer surface of the cylinder (32) between the attaching bore (31) and the cylinder (32), the actuation portion (50) being pushed to retract the cylinder (32) from the take-out position (A) to the charging position (B); and
   a receiving portion (46) which receives the check valve member (29) on a halfway while the cylinder (32) is retreating from the take-out position (A) to the charging position (B).

2. The valve assembly with the check valve as set forth in claim 1, wherein a pressure chamber (48) is provided within the attaching bore (31), fluid pressure within the pressure chamber (48) being acted onto the actuation portion (50) to retract the cylinder (32) from the take-out position (A) to the charging position (B).

3. The valve assembly with the check valve as set forth in claim 1 further including an insertion hole (64) which communicates the attaching bore (31) with an exterior of the housing (4) and a pushing means (65) which is inserted into the insertion hole (64) and pushes the actuation portion (50).

4. The valve assembly with the check valve as set forth in claim 1 further including a return spring (37) which is arranged within the housing (4) and resiliently pushes the cylinder (32) toward the take-out position (A).

5. The valve assembly with the check valve as set forth in claim 4, wherein the cylinder (32) has a hermetically sealing and sliding portion (53) and the return spring (37) has a resilient pushing force set to a value larger than that of a reversely flowing fluid pressure applied to a sectional area (54) of the hermetically sealing and sliding portion (53).

6. The valve assembly with the check valve as set forth in claim 4, wherein the cylinder has a hermetically sealing and sliding portion (53) and the return spring (37) has a resilient pushing force set to a value larger than that of a reversely flowing fluid pressure applied to a differential area obtained by deducting a sectional area (55) of a valve face of the check valve member (29) from a sectional area (54) of the hermetically sealing and sliding portion (53).

7. The valve assembly with the check valve as set forth in claim 1, wherein the cylinder (32) has a hermetically sealing and sliding portion (53) and a valve face of the check valve member (29) has a sectional area (55) set to a value larger than that of a sectional area (54) of the hermetically sealing and sliding portion (53).

8. The valve assembly with the check valve as set forth in claim 1, wherein the chamber outlet (41) is formed to have an inner diameter not less than that of the outlet bore in dimension.

9. The valve assembly with the check valve as set forth in claim 1 further including an engaging portion (68) provided in the cylinder (32) and a limiting means (69) provided in the attaching bore (31), the limiting means (69) engaging with the engaging portion (68) to limit the cylinder (32) from retreating toward the charging position (B) when the cylinder (32) is switched over to the take-out position (A), and cancelling the engagement, thereby allowing the cylinder (32) to retreat toward the charging position (B).

* * * * *